United States Patent [19]
Scherer et al.

[11] 3,859,424
[45] Jan. 7, 1975

[54] PROCESS AND CATALYST FOR FLUORINATING ALIPHATIC COMPOUNDS

[75] Inventors: Otto Scherer, Bad Soden/Taunus; Jurgen Korinth, Hofheim/Taunus; Peter Frisch, Frankfurt Am Main, all of Germany

[73] Assignee: Farbwerke Hoechst Aktiengesellschaft vormals Meister Lucius & Bruning, Frankfurt Am Main, Germany

[22] Filed: Feb. 19, 1971

[21] Appl. No.: 117,052

Related U.S. Application Data
[63] Continuation-in-part of Ser. No. 601,846, Dec. 15, 1966, abandoned, which is a continuation-in-part of Ser. No. 248,866, Jan. 2, 1963, abandoned.

[30] Foreign Application Priority Data

| Jan. 13, 1962 | Germany | 1252182 |
| June 20, 1962 | Germany | 1254611 |
| Aug. 25, 1962 | Germany | 1282630 |
| Aug. 16, 1962 | Germany | 1443835 |
| Aug. 31, 1962 | Germany | 1443837 |

[52] U.S. Cl.................... 423/472, 423/53, 252/441

[51] Int. Cl........................ C01g 37/06, B01j 11/78
[58] Field of Search............. 23/88, 85, 86; 252/441

[56] References Cited
UNITED STATES PATENTS

| 2,745,886 | 5/1956 | Ruh et al. | 23/88 X |
| 3,134,640 | 5/1964 | Hengeveld et al. | 23/86 X |
| 3,149,170 | 9/1964 | Clark | 260/653.4 |
| 3,431,067 | 3/1969 | Kato et al. | 23/88 |

OTHER PUBLICATIONS

Journal of the American Chemical Society, Vol. 74, Nov. 5, 1952, pages 5262–5264, Article by A. Engelbrecht et al.

Bartlett et al., J. Chem. Soc. (London), August 1961, pages 3549–3550.

*Primary Examiner*—Edward Stern
*Attorney, Agent, or Firm*—Curtis, Morris & Safford

[57] ABSTRACT

A novel fluorination catalyst and its preparation, by reacting a hydrated oxide of trivalent chromium with hydrogen fluoride, is described as having utility in fluorinating halogenated aliphatic hydrocarbon.

5 Claims, No Drawings

PROCESS AND CATALYST FOR FLUORINATING ALIPHATIC COMPOUNDS

This application is a continuation-in-part of our application Ser. No. 601,846 filed Dec. 15, 1966, and now abandoned which for its part is a continuation-in-part of our application Ser. No. 248,866 filed Jan. 2, 1963, now abandoned.

The present invention relates to a process and catalyst for fluorinating aliphatic compounds having at most 4 carbon atoms.

It is known to exchange in halogenated hydrocarbons one or several halogen atoms for fluorine atoms by the action of hydrogen fluoride in the gaseous phase at elevated temperatures and in the presence of catalysts, for example aluminum fluoride. For the fluorination of chlorinated ethylenes only one catalyst is known which is obtained by rapidly heating hydrous chromic fluoride $CrF_3 \cdot xH_2O$ ($x \geq 3$), while passing over oxygen, at a temperature above 350°C, preferably 500° – 600°C. This catalyst, which has the empirical composition $CrO_3F_2$, allows the transformation of, for example, trichloroethylene into trifluoroethyl chloride under the action of hydrogen fluoride. With this catalyst saturated compounds can likewise be fluorinated, for example carbon tetrachloride can be reacted to yield trifluorochloromethane and tetrafluoromethane. When used for some perhalogenated alkanes, especially hexachloroethane and octachloropropane, the known process involves considerable difficulties owing to the physical properties of these compounds. Hexachloroethane, for example, has no melting point at atmospheric pressure, it sublimes at 186°C. It is thus difficult to produce a pure starting material and in a continuously operating process such a material is difficult to handle.

It has now been found that chlorinated and/or brominated aliphatic compounds which, besides carbon, chlorine and/or bromine, may contain fluorine, hydrogen and/or oxygen, can be fluorinated with hydrogen fluoride at higher temperatures in the gaseous phase using as catalysts chromic oxyfluorides prepared by reacting a hydrated oxide of trivalent chromium, also called hydrous or hydrated chromic oxides, with hydrogen fluoride at elevated temperature.

These compounds are fluorination catalysts having at least the same as, in most cases, however, a better activity than the known catalyst of the formula $CrO_3F_2$ obtainable by heating hydrous chromic fluoride $CrF_3 \cdot xH_2O$ in the presence of oxygen as referred to above.

The new catalysts of the invention consisting essentially of chromium and fluorine and oxygen in combination therewith are particularly distinguished by their very simple mode of preparation.

In the fluorination according to the invention, which, in the case of non-olefinic compounds, is a substitution of fluorine atoms for chlorine and/or bromine atoms, there can be used all aliphatic compounds that are free from acetylenic bonds, possess at most 4 carbon atoms and contain, besides carbon and perhaps hydrogen atoms, at least one chlorine or bromine atom. The compounds may further contain fluorine and/or oxygen atoms. When halogenated methanes or other halogenated compounds with more than one carbon atom and free from olefinic double bonds are used, they should have at least one carbon atom to which are linked at least two halogen atoms, at least one of which is not fluorine. Suitable for fluorination according to the invention are oxygen compounds such as halogenated carbonyl compounds, i.e., aldehydes and ketones, and halogen-carboxylic acid halides and halogen ethers.

Especially suitable are aliphatic compounds of the afore-mentioned classes in which the number of halogen atoms having an atomic weight in the range of 18 to 80 is greater than the number of hydrogen atoms. By aliphatic compounds there are to be understood in the sense of the invention also cycloaliphatic compounds.

The process of the invention is particularly suitable for fluorinating halogenated aliphatic compounds containing a trihalogen-methyl group with 3 halogen atoms having an atomic weight up to 80, at least one of which is not fluorine. Preferred are the perhalogenated aliphatic compounds in which at least one halogen atom is not fluorine.

By fluorinating and simultaneously splitting off hydrogen halide of a molecular weight up to 81 it is likewise possible to produce unsaturated aliphatic compounds from saturated aliphatic compounds. Still further, hydrogen fluoride can be added to suitable halogenated olefins and halogen atoms can be simultaneously exchanged whereby saturated compounds are obtained.

As halocarbons and halohydrocarbons which can be fluorinated by the process of the invention there are mentioned by way of example methylene chloride, chloroform, carbon tetrachloride, monofluoromonochloromethane, monofluoridibromomethane, difluorochloromethane, trifluorochloromethane, 1,1,1-trichloroethane, tetrachloroethane, hexachloroethane, difluorotetrachloroethane, trifluoropentachloropropane, octachloropropane, 1,1,1,3-tetrachloropropane, 1-chloro-1-bromobutane, chlorine-free bromine-containing compounds such as methylene bromide, carbon tetrabromide, furthermore unsaturated compounds such as tetrachloroethylene, trichloroethylene, 1,1-dichloroethylene, 1-chloroethylene, the corresponding brominated ethylenes as well as the chlorinated and/or brominated propenes and butenes, for example hexachloropropene.

A suitable halogen-aldehyde is, for example, trichloroacetaldehyde, a suitable halogen-ketone is hexachloroacetone. Suitable halogen-carboxylic acid halides are, for example, trichloroacetyl chloride and trichloroacetylfluoride, and suitable halogen ethers are hexachloro-dimethyl ether, octachlorodiethyl ether and hexachloro-divinyl ether.

It is more advantageous to react bromine-free compounds than bromine-containing compounds.

The proportion between the aliphatic compound to be fluorinated and hydrogen fluoride depends in the first place on the degree of fluorination desired; it can be easily determined by a preliminary test. In general, 1 to 2 mols of hydrogen fluoride are used for one mol of halohydrocarbon to be fluorinated when one halogen atom is to be replaced per molecule by a fluorine atom. If two, three or more halogen atoms are to be exchanged two or three times the amount or a larger amount of hydrogen fluoride is used, i.e. at least 2 mols of hydrogen fluoride for one mol of aliphatic compound to be fluorinated. Alternatively, still larger amounts of hydrogen fluoride can be used, for example when a higher number of halogen atoms is to be exchanged in the molecule or when the last exchangeable halogen atom is to be replaced by fluorine.

The process of the invention is carried out at elevated temperatures, in general at a temperature above 100°C, preferably 150°C – 500°C and more preferably 150°C – 400°C. The reaction of oxygen-containing compounds is preferably carried out at a temperature in the range of 150°C to 300°C and advantageously 200°C to 250°C. Perhalogenated methanes are reacted to yield carbon tetrafluoride preferably at a temperature ranging from 250°C to 400°C.

For the sake of simplicity, the process of the invention is carried out at atmospheric pressure. It is likewise possible, of course, to operate at higher or lower pressures; the application of superatmospheric pressure often increases the degree of fluorination. The residence time of the reactants in the reaction zone is, in general, very short, for example 1 – 60 seconds and advantageously 5 – 20 seconds.

In the preparation of the catalysts of the invention by fluorination of hydrated chromic oxides by means of hydrogen fluoride, which is suitably carried out in the reaction zone in which the fluorination of the organic compound takes place, a reduction in volume of the material used occurs. It is, therefore, advantageous to work in a zone, preferably a tube, the direction of the longitudinal axis of which deviates from the horizontal by 30° or more, especially in a vertical tube, so that the catalyst remains densely packed.

The reaction products obtained are gaseous or liquid, saturated or unsaturated fluorine-containing aliphatic compounds. In general, a reaction product is obtained that consists of a mixture of components having different degrees of fluorination. A smooth perfluorination can often be obtained, especially with oxygen-containing starting compounds. Trichloroacetyl chloride or trichloroacetyl fluoride yield, for example, trifluoroacetyl fluoride; hexachloro-acetone yields hexafluoro-acetone; trichloroacetic aldehyde (chloral) gives trifluoroacetic aldehyde (fluoral). The latter reaction takes place already at a temperature of 200°C with an excellent yield.

The reaction mixture is advantageously processed by first separating hydrogen fluoride and hydrogen chloride. If the reaction products are insoluble in water and inert against water, this can be done by scrubbing with water. The fluorinated aliphatic compounds are then dried and, if necessary, subjected to fractional distillation.

If the fluorination of highly halogenated compounds according to the process of the invention, especially hexachloroethane and octachloropropane, it is difficult to introduce these compounds into the reaction zone due to their physical properties. It is, therefore, advantageous to use instead of the alkanes the corresponding alkenes containing two chlorine atoms less and to introduce them into the reaction zone together with chlorine where they are reacted to yield the desired alkanes and fluorinated according to the invention. This method can be used for all halogenated alkanes having up to 4 carbon atoms. It is especially important, however, to the treatment of perchloroethylene, perchloropropene and the corresponding butenes and butadienes.

The halogenated alkene, the halogen atoms of which are preferably chlorine and/or fluorine atoms, is passed continuously over the catalyst together with chlorine, at the temperatures defined above, advantageously in the range of 150° to 350°C. The halogen alkene is preferably used in a slight molar excess of about 2 to 10 mol % with regard to chlorine. The excess is generally recovered unchanged. By the addition of two chlorine atoms on the double bond of the halogen alkene there is first formed, at least partially, the corresponding perhalogenated compound.

It may be of advantage to maintain different parts of the reaction zone at different temperatures.

The required hydrogen fluoride can be added to one of the two gaseous starting substances or to their mixture prior to their entry into the reaction zone, or it can be added wholly or partially after the formation of the corresponding halogen alkane. The amount of hydrogen fluoride depends on the desired degree of fluorination. In order to avoid with certainty obstructions in colder parts of the apparatus by unreacted perchloroalkanes it is suitable to add more than 2 mols of hydrogen fluoride per mol of perchloroalkene, preferably 3 to 5 mols.

In the process of the invention there can be reacted with hydrogen fluoride and chlorine all perhalogenated ethylenes and propylenes, whose halogen atoms are chlorine and/or fluorine and which contain at least one chlorine atom, for example:

tetrachloroethylene, trichloromonofluoroethylene, the various dichlorodifluoroethylenes, monochlorotrifluoroethylene, hexachloropropene, pentachloromonofluoropropenes, tetrachlorodifluoropropenes, trichlorotrifluoropropenes, dichlorotetrafluoropropenes, monochloropentafluoropropenes and hexafluoropropene. The corresponding halogenated and preferably perhalogenated butenes and butadienes can likewise be used.

In general, the organic reaction product obtained is a mixture of all theoretically possible fluorinated perhalogen alkanes. When perhalogen ethanes are produced the organic reaction mixture predominantly consists of compounds having 2 to 5 and preferably 2 to 4 fluorine atoms and 4 to 1 and preferably 4 to 2 chlorine atoms. In the case of perhalogen propanes the reaction mixture predominantly consists of compounds having 3 to 6 fluorine atoms and 5 to 2 chlorine atoms.

The mixtures are processed in usual manner, for example by fractional distillation, whereby the pure compounds are obtained.

By the use of the aforesaid perhalogen alkenes as starting products for the fluorination reaction according to the invention, the formation of alkanes containing hydrogen atoms in addition to halogen atoms is substantially avoided.

The catalysts to be used according to the invention are prepared by heating a hydrated oxide of trivalent chromium, also called hydrous chromic oxide, while passing over hydrogen fluoride, advantageously with addition of an inert gas such as nitrogen, argon or another gas that is inert under the reaction conditions, the molar ratio of inert gas to hydrogen fluoride being up to 100 : 1, preferably 10 : 1.

Hydrated oxides of trivalent chromium ($Cr_2O_3 \cdot xH_2O$) (Gmelins Handbuch (1962), Chrom. B, p. 60, according to which $x$ may be 1 to 9) is the broad term for the various well known hydration stages of chromic oxide such as chromic hydroxide ($2Cr(OH)_3 = Cr_2O_3 \cdot 3H_2O$) and Guignet's green, which, according to Kirk-Othmer, vol. 3, p. 945, is a hydrated chromic oxide (Gmelins Handbuch, loc.cit., p. 81, shows the formula $Cr_2O_3 \cdot 2H_2O$ for Guignet's green); (cf. also Fricke- Huttig "Hydroxide and Oxydhydrate," Leipzig 1937, pages 252 – 268).

Catalysts having a certain activity are already obtained when the hydrated chromic oxide is fluorinated with gaseous hydrogen fluoride at a temperature near room temperature, for example about 10° to 25°C, and the product obtained is then dried by heating it at a temperature of about 100°C or thereabove.

In order to obtain catalysts having a good activity by the process of the invention it is necessary, however, to perform the major part of the fluorination at a temperature above 150°C, advantageously at a temperature in the range of from 200° to 600°C and more advantageously 350° to 450°C.

For one mol of hydrated chromic oxide there is required, in general, double the equimolar amount of hydrogen fluoride or more, preferably three to eight times the amount. The amount largely depends on the rate of flow of the hydrogen fluoride. It is likewise possible to obtain active catalysts with an equimolar amount or a still smaller amount of hydrogen fluoride. For the sake of simplicity the catalyst is prepared at atmospheric pressure, higher or smaller pressures being, of course, likewise possible.

The fluorination time of the hydrated chromic oxides and the heating time are not critical. As described in Example 14 a good catalyst is obtained after 130 minutes of fluorination. No essentially different result is obtained by fluorinating up to 100 hours. By calculating about 10 minutes for heating the reactor to reaction temperature, a range of 2 – 100 hours results as the period of time required for producing the catalyst in issue. It is advantageous to reach the fluorination temperature as rapidly as the furnace permits, for example within 10 – 30 minutes to 200°C or within 10 – 60 minutes to 350°C or a still higher temperature. For the reasons set forth above it is advantageous to heat the catalyst while simultaneously passing over hydrogen fluoride. The time of fluorination and the amount of hydrogen fluoride used have no upper limit besides economical considerations. A perfluorination, i.e., the formation of chromic fluoride $CrF_3$, does not occur even if a hundred times the amount of hydrogen fluoride is used with a fluorination time of more than 100 hours. In many cases, however, the activity of the catalyst is improved in the course of the action of hydrogen fluoride.

Active fluorination catalysts are likewise obtained by treating mixtures of different chromic oxides with hydrogen fluoride as described above.

Due to the absence of an oxidant the trivalent chromium which is used for the preparation of the catalysts according to the invention in the form of its hydrated oxides, retains its trivalent state during the fluorination with hydrogen fluoride and, consequently, it is contained in the finished catalyst in the trivalent state. By this fact the catalysts according to the invention substantially differ from the hitherto known chromic oxyfluoride of the empirical formula $CrO_3F_2$ obtained in the presence of oxygen, i.e., with oxidation, in which according to its high content of oxygen the chromium has at least partially a valence stage above III.

As compared therewith, by the process of the invention a black catalyst is prepared from chromic hydroxide ($Cr(OH)_3$ or $Cr_2O_3 \cdot 3H_2O$) having approximately the empirical composition $CrF_2O$. Depending on the mode of preparation of the chromic hydroxide and the fluorination conditions, the composition may vary, the fluorine content may diminish while the oxygen content increases, at most to an empirical composition $CrF_{1.5}O_{1.5}$.

Green hydrated chromic oxide (Guignet's Green) yields an intensely green catalyst, the empirical composition of which varies between the formulae $CrF_{1.5}O_{1.5}$ and $CrFO_2$. The formulae are a result of chemical analyses and solely illustrate the found ratio of Cr to F to O, when the found molar amount of chromium is taken as 1. In summary the empirical composition of the catalyst lies between the formulae $CrF_2O$ and $CrFO_2$ when the molar amount of chromium is taken as one.

A structural formula has not yet been ascertained for the catalysts. Owing to their composition they are to be considered as chromic oxyfluorides. They differ from the known chromic oxyfluoride $CrO_3F_2$, having a greenish yellow-brown colour, by their chemical composition and colour.

As compared with the preparation of the known chromium oxyfluoride, the preparation according to the invention of the novel catalysts represents a considerable technical progress since they are prepared directly by fluorinating the hydrated chromic oxides, preferably in the same apparatus in which the fluorination of the hydrocarbons is then performed. The catalyst need not be activated by oxidation as is the case with the hydrous chromic fluoride.

Thus two operational steps can be dispensed with, namely:

1. the conversion of chromic hydroxide, or chromium oxide $CrO_3$ with simultaneous reduction, with aqueous hydrofluoric acid into hydrous chromic fluoride in a separate apparatus and isolation of the hydrous chromic fluoride;

2. the subsequent oxidation of said hydrous chromic fluoride. This is rather difficult on an industrial scale since it requires most rapid heating of the contact furnace to high temperatures, for example to 500°C.

In the present process longer heating times are feasible. Furthermore, partial neutralisation of the hydrated chromic oxide evolves additional heat.

After having been prepared in a contact furnace, the catalyst of the invention can be used at once for the fluorination reaction by adding to the current of hydrogen fluoride one of the chlorine and/or bromine-containing compounds defined above. A further advantage resides in that after having been wetted with water, the starting materials for the preparation of the catalysts, i.e., the various hydrated oxides of trivalent chromium can be made into stable shaped bodies without the application of pressure or other means.

It is a special advantage of the present process that the novel catalysts are very active. Even after a prolonged period of use the activity of the catalysts does not decrease in most cases to a measurable degree. Thus with the novel catalysts there is attained in comparison with the known fluorination catalysts, either a higher degree of fluorination at the same temperature or the same degree of fluorination at a lower temperature. The application of lower temperatures is especially desirable for the reasons of corrosion. Still further, it has the advantage that less stable starting and/or final products of the fluorination can be treated under milder conditions. Carbon tetrachloride, for example, yields at 350°C more than 90 % of carbon tetrafluoride while chloroform gives at 120°C still a satisfactory yield of fluoroform. When chlorinated ethylenes are fluorinated, especially trichloroethylene, in the presence of the novel catalysts a higher conversion and yield are obtained even at a reaction temperature which is by 100°C lower than in the reaction with the known chromium oxyfluoride made from hydrous chromic fluoride.

It is surprising that the chromic oxyfluorides of the invention represent fluorination catalysts having such a high activity. The use of these catalysts offers the advantage that higher degrees of fluorination can be attained and that the reaction can be performed at lower temperatures. By this latter fact the corrosion of the apparatus is largely reduced and decomposable products can be treated under milder conditions.

Still further, it is surprising that also oxygen-containing compounds can be fluorinated with the aforedefined chromic oxyfluoride catalysts at relatively low temperatures. As compared with other catalysts, this means less corrosion of the apparatus and milder conditions for the starting and final products. The reaction of chlorinated ketones, ethers and acid halides in the gaseous phase on a catalyst is novel.

Finally, it is very surprising that the addition of chlorine on perhalogen alkenes in the presence of the catalysts of the invention is so smooth and complete with the use of an excess of perhalogen alkenes, so that corrosion problems, especially in the processing of the products, can be avoided. This fact and the possibility of carrying out two different reactions on the same catalyst, namely an addition of chlorine to an olefinic double bond and a substitution of fluorine for chlorine bound to carbon, represent a considerable industrial progress. A class of compounds which were difficult to prepare, especially in continuous manner, in view of apparatus problems have now become readily accessible.

The fluorine-containing products obtained by the process of the invention are suitable as heat transfer agent, as aerosol propellants and as intermediate products for chemical syntheses.

The following Examples serve to illustrate the invention.

EXAMPLE 1

530 Grams of chromic hydroxide in the form of cubes (length of edges 3 – 6 mm) were filled into nickel tube having an inside diameter of 5 cm. By means of an electric furnace the nickel tube was heated within 40 minutes to 400°C while passing through hydrogen fluoride. The furnace was switched off and the tube was cooled to 360°C within 1.5 hours. During this time 210 grams of hydrogen fluoride were passed through.

The catalyst thus prepared was contacted with hydrogen fluoride and trichloroethylene in a molar proportion of about 6 : 1 at a temperature in the range of 360° – 340°C. After a period of 7.75 hours, in which the yield per unit of time was slightly improved, the catalyst was contacted at 340°C for 6.25 hours with 570 grams of anhydrous hydrogen fluoride and 522 grams of trichloroethylene. After having left the furnace, the reaction mixture was passed through two absorption vessels filled with water and cooled to about room temperature in order to eliminate hydrogen fluoride and hydrogen chloride, conducted to a drying tower filled with calcium chloride and condensed in a trap cooled with solid carbon dioxide. 455 grams of organic substance were obtained which contained 21 grams of $CCl_2=CHCl$ and 410 grams of $CF_3—CH_2Cl$.

The difference between the trichloroethylene used and the trichloroethylene recovered indicates a yield of 96.0 %. The yield of trifluoroethyl chloride was 90.8 %, calculated on the reacted trichloroethylene.

When a catalyst was used which had been obtained by heating hydrous chromium fluoride in the presence of oxygen, and this catalyst was contacted with 1,660 grams of trichloroethylene and 1,920 grams of hydrogen fluoride there were obtained 129 grams of unreacted trichloroethylene and 1,180 grams of trifluoroethyl chloride, corresponding to a conversion of trichloroethylene of about 92 % only and a yield of trifluoroethyl chloride of 85.5 % only.

EXAMPLE 2

A catalyst obtained by fluorinating chromic hydroxide and having a bulk volume of about 0.8 liter, was contacted within 5 hours at 350°C with 450 grams (2.92 mols) of carbon tetrachloride and 280 grams (14.0 mols) of hydrogen fluoride.

265 grams of organic product were obtained composed of 238 grams (92.5 %) of tetrafluoromethane and 18 grams (5.8 %) of trifluoromonochloromethane, calculated on the amount of carbon tetrachloride used. 11.22 mols of hydrogen chloride were found.

EXAMPLE 3

520 grams of Guignet's green in the form of cubes (length of edges 5 – 10 mm) were filled into the apparatus described in Example 1. The tube was heated within about 1 hour at 530°C, while passing through hydrogen fluoride, the furnace was switched off and the tube was cooled within 1 hour to 470°C. During this time 140 grams of hydrogen fluoride were passed through.

The catalyst thus obtained was then contacted with hydrogen fluoride and trichloroethylene in a molar proportion of about 6 : 1. After a period of 14 hours at a temperature in the range of 470° – 340°C, 500 grams of anhydrous hydrogen fluoride and 510 grams of trichloroethylene were passed at 340°C for 6 hours over the catalyst. 93.3 % of the trichloroethylene wer converted, the yield of trifluoroethyl chloride amounted to 90.5 %.

When the catalyst, after having been in operation for 25 hours, was contacted for 6.25 hours with 475 grams of anhydrous hydrogen fluoride and 540 grams of trichloroethylene under the conditions defined above, a conversion of 93.0 % and a yield of trifluoroethyl chloride of 92.5 % were obtained.

EXAMPLE 4

A catalyst obtained by fluorinating Guignet's green and having a bulk volume of about 1 liter was contacted at 250°C for 5.8 hours with 450 grams (5.29 mols) of methylene chloride and 460 grams (23 mols) of hydrogen fluoride. 300 grams of fluorinated products were obtained, 6.98 mols of hydrogen chloride were found.

EXAMPLE 5

The catalyst as described in Example 2 was contacted at 200°C within 4.75 hours with 828 grams (6.93 mols) of chloroform and 415 grams (20.75 mols) of hydrogen fluoride. 485 grams of organic product were obtained composed of 430 grams (88.6 %) of $CHF_3$, 6 grams (1.0 %) of $CHClF_2$, 3 grams (0.4 %) of $CHCl_2F$ and 47 grams (5.5 %) of $CHCl_3$, calculated on the chloroform used. 19.0 mols of HCl were found.

EXAMPLE 6

A catalyst as described in Example 2 was contacted at 350°C for 6 hours with 502 grams (2.96 mols) of difluorotrichloroethane and 545 grams (27.5 mols) of hydrogen fluoride. 371 grams of organic product were obtained, 150 grams (1.25 mols) of which were pentafluoroethane. 6.4 mols of HCl were found.

EXAMPLE 7

A catalyst as described in Example 2 was contacted at 300°C for 5 hours with 620 grams (2.62 mols) of hexachloroethane and 240 grams (12 mols) of hydrogen fluoride. The yield of organic product, calculated on the hexachloroethane used, amounted to: 1.9 % of pentafluoromonochloroethane, 49.6 % of tetrafluorodichloroethane, 34.0 % of trifluorotrichloroethane, 8.0 % of difluorotetrachloroethane, 1.1 % of hexachloroethane. 9.22 mols of HCl were found.

EXAMPLE 8

A catalyst as described in Example 2 was contacted at 250°C for 6 hours with 510 grams (3.89 mols) of trichloroethylene and 530 grams (26.5 mols) of hydrogen fluoride. 445 grams of organic product were obtained composed of 95.9 % of trifluoromonochloroethane and 1.9 % of trichloroethylene. The conversion amounted to 98.3 %, calculated on the trichloroethylene used and the yield to 94.8 %, calculated on the reacted trichloroethylene. 7.66 mols of HCl were found.

EXAMPLE 9

A catalyst as described in Example 2 was contacted at 200°C for 5.25 hours with 3.3 mols of $CCl_2=CHBr$ and 20.25 mols of hydrogen fluoride. The yield amounted to 2.29 mols of $CF_3-CH_2-Br$, i.e. 69.2 % of the theoretical, calculated on the $CCl_2=CHBr$ used.

EXAMPLE 10

A catalyst as described in Example 2 was contacted at 200°C for 1.75 hours with 196 grams of 1,1,1,3-tetrachloropropane and 140 grams of hydrogen fluoride. 101 grams of organic product were obtained which were subjected to fractional distillation. 60 grams (58 %) of 1,1,1-trifluoropropene and 41 grams (28.5 %) of 1,1,1-trifluoro-3-chloropropane were obtained, calculated on the tetrachloropropane used. 4.04 mols of HCl were found.

EXAMPLE 11

A catalyst as described in Example 2 was contacted at 230°C for 3 hours with 364 grams (2.0 mols) of trichloroacetyl chloride and 250 grams (12.5 mols) of hydrogen fluoride. The gases leaving the reaction furnace were absorbed in water. A good yield of trifluoroacetic acid and small amounts of difluorochloroacetic acid were isolated.

EXAMPLE 12

A catalyst as described in Example 2 was contacted at 250°C for 2.75 hours with 181 grams (0.68 mol) of hexachloroacetone and 215 grams (10.75 mols) of hydrogen fluoride. 91 grams (0.55 mol) of hexafluoroacetone were isolated, corresponding to a yield of 81 %, calculated on the hexachloroacetone. 4.02 mols of hydrogen chloride were found.

EXAMPLE 13

A catalyst as described in Example 2 was contacted at 220°C for 2 hours with 227 grams (1.54 mols) of chloral and 175 grams (8.75 mols) of hydrogen fluoride. The gases leaving the fluorination furnace contained 1.32 mols of fluoral and were substantially free from lower fluorinated aldehydes. The yield of fluoral was 85.7 %, calculated on the chloral used. 4.48 mols of hydrogen chloride were found.

In the same manner 6 to 7 gram atoms of chlorine could be replaced by fluorine per molecule of octachlorodiethyl ether.

EXAMPLE 14

530 grams of chromic hydroxide in the form of cubes (length of edges 3 - 6 mm) were filled into a nickel tube having an inside diameter of 5 cm. By means of an electric furnace the nickel tube was heated within 40 minutes to 400°C while passing through hydrogen fluoride. The furnace was switched off and the tube was cooled to 360°C within 90 minutes. During that time 210 grams of hydrogen fluoride were passed through. The activity of the catalyst thus prepared was tested by fluorinating carbon tetrachloride with hydrogen fluoride.

The catalyst thus obtained was then contacted at a temperature of 300°C for 5.5 hours with 430 grams of anhydrous hydrogen fluoride, 839 grams of perchloroethylene and 327 grams of chlorine. After their issue from the reaction zone, the reaction mixture did not contain free chlorine. It was passed through two absorption vessels filled with water and cooled with ice in order to remove hydrogen fluoride and hydrogen chloride and then conducted to a drying tower filled with calcium chloride and to a trap cooled with solid carbon dioxide. 825 grams of organic substance were obtained in the absorption vessels and the trap.

The reaction mixture thus obtained was subjected to fractional distillation. The yield, calculated on the perchloroethylene used, was:

22.6 mol % of pentafluorochloroethane
48.4 mol % of tetrafluorodichloroethane
13.9 mol % of trifluorotrichloroethane
3.9 mol % of difluorotetrachloroethane
7.4 mol % of perchloroethylene
96.2 % of the perchloroethylene used were obtained in the form of fluorinated products or recovered in unchanged form. Only traces of hexachloroethane could be detected.

EXAMPLE 15

652 grams of Guignet's green in the form of cubes (length of edges 5 to 10 mm) were filled into an apparatus as described in Example 14. The tube was heated within 40 minutes to 420°C while passing through hydrogen fluoride and then cooled to 350°C within 140 minutes. During the cooling time 360 grams of hydrogen fluoride were passed through. The catalyst was tested as described in Example 14.

The catalyst thus obtained was then contacted for 6 hours at 300°C within 360 grams of anhydrous hydrogen fluoride, 956 grams of perchloroethylene and 356 grams of chlorine.

The process was carried out as described in Example 14. In the gas leaving the furnace no free chlorine could be detected. 981 grams of organic substances were obtained. By fractional distillation 13.2 mol % of tetrafluorodichloroethane
48.2 mol % of trifluorotrichloroethane
17.9 mol % of difluorotetrachloroethane and
13.0 mol % of perchloroethylene were obtained, calculated on the perchloroethylene used.

92.3 % of the perchloroethylene were recovered in the form of fluorinated products or in unchanged form. Pentafluorochloroethylene and hexachloroethane could only be detected in traces.

EXAMPLE 16

A catalyst as described in Example 2 was contacted at 300°C for 1.3 hours with 230 grams (0.92 mol) of hexachloropropene, 64 grams (0.9 mol) of chlorine and 108 grams (5.4 mols) of hydrogen fluoride. 61 grams (0.28 mol) of $C_3F_6Cl_2$, 98 grams (0.41 mol) of $C_3F_5Cl_3$ and 16 grams of higher boiling compounds were obtained. The yields of the two main products were 30.4 and 44.5 %, respectively, calculated on the hexachloropropene used. The reaction product contained 4.53 mols of hydrogen chloride.

EXAMPLE 17

A catalyst as described in Example 1 was contacted for 1 hour at 290°C with 193 grams (0.97 mol) of trifluorotrichloropropene, 62 grams (0.87 mol) of chlorine and 85 grams (4.25 mols) of hydrogen fluoride. 125 grams (0.57 mol) of $C_3F_6Cl_2$, 29 grams (0.12 mol) of $C_3F_5Cl_3$ and 20 grams of higher boiling compounds were obtained, the yield of the two main products was 59 % and 12.4 %, respectively, calculated on the trifluorotrichloropropene. The reaction product contained 2.55 mols of hydrogen chloride.

What is claimed is:

1. A process for preparing a fluorination catalyst consisting essentially of chromium and fluorine and oxygen in combination therewith, the empirical composition of which varies between $CrF_2O$ and $CrFO_2$ when the molar amount of chromium is taken as one, which comprises passing over a hydrated oxide of trivalent chromium of the general formula $Cr_2O_3 \cdot xH_2O$, wherein $x$ is from 1 to 9, 3 to 8 moles of hydrogen fluoride per mole of said hydrated oxide of trivalent chromium at a temperature in the range from 150° to 600°C and for a time from 2 to 100 hours.

2. A process as defined in claim 1, which comprises passing over said hydrated oxide of trivalent chromium said hydrogen fluoride at a temperature in the range from 350° to 450°C.

3. A process as defined in claim 1, wherein the hydrogen fluoride has been diluted with an inert gas.

4. A process for preparing a fluorination catalyst consisting essentially of chromium and fluorine and oxygen in combination therewith, the empirical composition of which varies between $CrF_{1.5}O_{1.5}$ and $CrF_2O$ when the molar amount of chromium is taken as one, which comprises passing at about atmospheric pressure at a temperature in the range from 200° to 600°C, over chromic hydroxide of the general formula $Cr_2O_3 \cdot 3H_2O$, 3 to 8 moles of hydrogen fluoride per mole of said chromic hydroxide, said hydrogen fluoride being diluted with an inert gas, for a time from 2 to 100 hours.

5. A process for preparing a fluorination catalyst consisting essentially of chromium and fluorine and oxygen in combination therewith, the empirical composition of which varies between $CrF_{1.5}O_{1.5}$ and $CrFO_2$ when the molar amount of chromium is taken as one, which comprises passing at about atmospheric pressure at a temperature in the range from 200° to 600°C, over "Guignet's green" of the general formula $Cr_2O_3 \cdot 2H_2O$, 3 to 8 moles of hydrogen fluoride per mole of said "Guignet's green," said hydrogen fluoride being diluted with an inert gas, for a time from 2 to 100 hours.

* * * * *